March 22, 1960  J. M. WUERTH  2,929,246
KINETIC VECTOR COMPUTING ACCELEROMETER
Filed Dec. 26, 1952  4 Sheets-Sheet 1

INVENTOR.
JOHN M. WUERTH
BY
*William R. Lane*
ATTORNEY

March 22, 1960 J. M. WUERTH 2,929,246
KINETIC VECTOR COMPUTING ACCELEROMETER
Filed Dec. 26, 1952 4 Sheets-Sheet 2

INVENTOR.
JOHN M. WUERTH
BY
William P. Lane
ATTORNEY

March 22, 1960     J. M. WUERTH     2,929,246
KINETIC VECTOR COMPUTING ACCELEROMETER
Filed Dec. 26, 1952     4 Sheets-Sheet 3

*INVENTOR.*
JOHN M. WUERTH
BY *William R. Lane*
ATTORNEY 2,929,246
Patented Mar. 22, 1960

United States Patent Office

2,929,246
KINETIC VECTOR COMPUTING ACCELEROMETER

John M. Wuerth, Whittier, Calif., assignor to North American Aviation, Inc.

Application December 26, 1952, Serial No. 328,075

16 Claims. (Cl. 73—178)

This invention pertains to a navigation device which measures acceleration and velocity over the surface of the earth. In particular, the device of this invention measures the horizontal components of its own acceleration and its own velocity which are caused by both the rotation of the earth and by translation over the surface of the earth.

The word "earth" when used herein without a modifier denotes the actual real earth. When a nonrotating earth is recited herein, a reference system is denoted whose origin coincides with the earth's center, which has one axis superimposed upon the axis of rotation of the earth and has the other two axes in the plane of the earth's equator fixed with respect to the fixed stars. Thus, when a device is stationary at a particular local point upon the earth, it is not stationary with respect to the nonrotating earth, but has a velocity due to earth rotation which is equal to the surface velocity at that particular local point upon the earth. The term "vertical" as used in this application is defined to be in the direction of pure gravitational attraction, exclusive of centrifugal force of the earth. This direction deviates from the direction of the conventional vertical at all points upon the surface of the earth other than the equator and the poles. A "horizontal" plane is a plane perpendicular to the vertical. A gravitational spheroid is a spheroid whose surface is normal to the direction of pure gravitational attraction. Gravitational latitude $\phi$ is defined as the complement of the angle between the earth's pole and the normal to the gravitational spheroid. Geographical latitude $\phi'$ is defined as the complement of the angle between the normal to the geoid and the earth's pole. Longitude is defined as the angle between a fixed meridian and the local meridian. Inertial longitude $\psi$ is defined as the angle between a standard meridian upon a nonrotating earth and the local meridian upon a rotating earth. Geographic longitude $\Lambda$ is defined as the angle between a standard meridian upon the actual rotating earth and the local meridian upon the actual earth. The earth's angular velocity is designated by the symbol $\Omega$.

The device of this invention operates with respect to a nonrotating earth. Because the device of this invention operates with respect to a nonrotating earth, Coriolis forces which are caused by the earth's rotation do not affect its operation.

This invention contemplates two rotors positioned with their spin axes mutually perpendicular in a horizontal plane. These rotors are mounted in a common frame which has two degrees of freedom about any set of mutually perpendicular axes in the horizontal plane. The center of gravity of the supported assembly lies directly below the center of support, so that any acceleration in the horizontal plane causes a torque upon the supported assembly. A pickoff detects any angular movement of the supported assembly from its initial horizontal position and sends control signals by appropriate servo amplifiers to the rotors to cause them to accelerate angularly. The reaction torque of the rotors is applied to the supported assembly and exactly counteracts the torques which are caused by the applied acceleration.

This invention contemplates the device mentioned above wherein the angular velocities of the two rotors are directly measurable and their vector sum is proportional to the instantaneous velocity of the device upon the surface of the earth.

It is therefore an object of this invention to provide a navigation instrument which measures horizontal acceleration and which is unaffected by Coriolis forces which are due to earth rotation.

It is another object of this invention to provide a navigation instrument which measures horizontal velocity and which is unaffected by Coriolis forces due to earth rotation.

It is another object of this invention to provide inertial angular velocity measuring means which are unaffected by Coriolis forces due to earth rotation.

It is another object of this invention to provide means which eliminate the effect of Coriolis forces, for determining angular velocity about the center of the earth.

It is another object of this invention to provide means for determining changes in the angular velocity of a stable reference about the center of the earth.

It is another object of this invention to provide movable means, which automatically compensate for earth rotational Coriolis forces, for determining the angular velocity of said means about the center of the earth.

It is another object of this invention to provide self-compensating movable means, which are not responsive to earth rotational Coriolis forces, for determining the instantaneous horizontal velocity of an object moving over the surface of the earth.

It is another object of this invention to provide velocity measuring means which are independent of rotations about the local vertical.

It is another object of this invention to provide means for determining the great circle distance between a starting position and the instantaneous position of an object upon the surface of the earth.

It is another object of this invention to provide means for automatically determining the latitude and longitude of an object upon the surface of the earth.

It is another object of this invention to provide automatic navigation means which are self-compensating for Coriolis forces due to rotation about a vertical axis.

It is another object of this invention to provide means for simultaneously determining the angular momentum of an object with respect to the center of the earth, the instantaneous velocity of said object, the distance said object has traveled along a predetermined great circle path upon the surface of the earth, and the deviation of said object from said path.

It is another object of this invention to provide a device which measures the integral of a torque.

It is another object of this invention to provide a device which measures the integral of a horizontal acceleration.

It is another object of this invention to provide two axis pick-off means for detecting components of movement in two directions.

Other objects of invention will become apparent from the following description taken in connection with the accompanying drawings, in which.

Figures 4, 5:
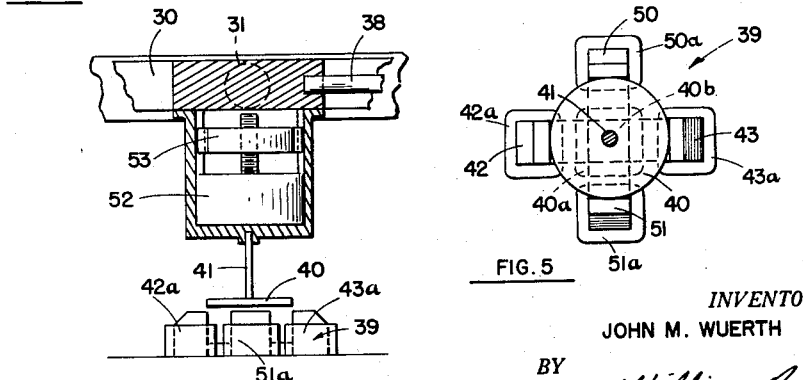
Fig. 4 is a view of Fig. 3 taken at 4—4.
Fig. 5 is a view of Fig. 3 taken at 5—5.
Figure 11:
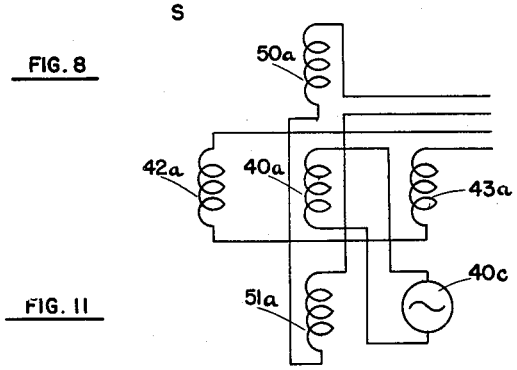

And Fig. 11 is a diagram of the electrical interconnection of pick-off coils of Fig. 5.

Figure 1:
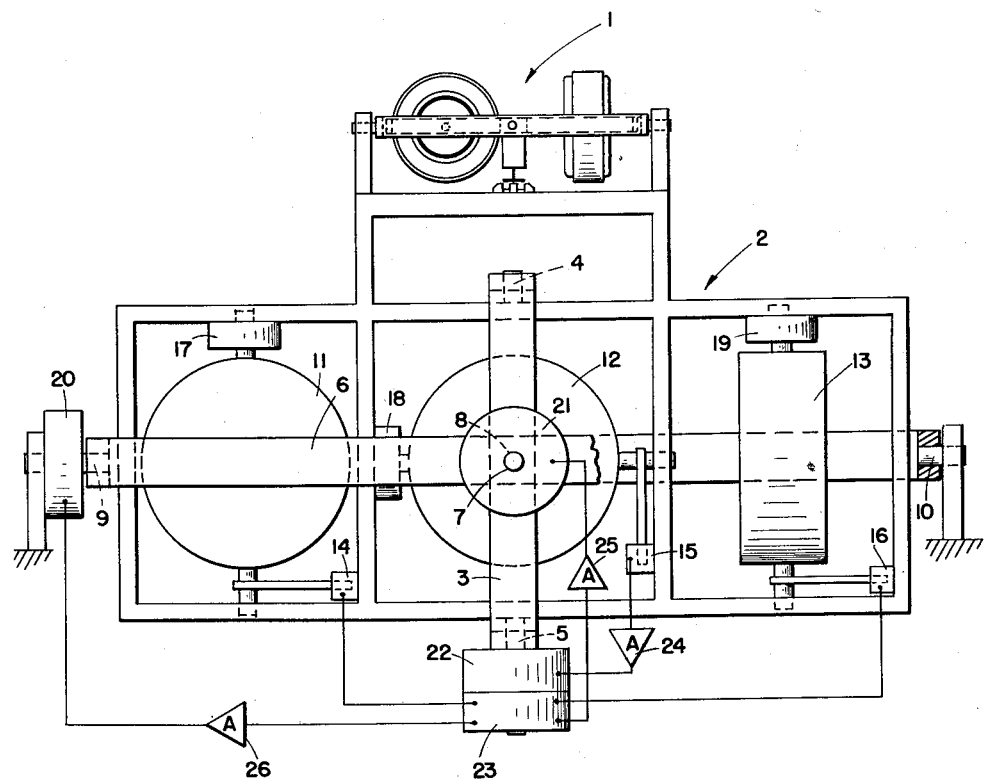
Fig. 1 is a side view of one embodiment of this invention mounted upon a stabilized platform.

In Fig. 1, device 1 is attached to and is maintained horizontal by stabilized platform 2. Stabilized platform 2 is shaft-mounted upon gimbal 3 by means of bearings 4 and 5. Gimbal 3 is shaft-mounted upon gimbal 6 by means of bearings 7 and 8. Gimbal 6 is shaft-mounted upon bearings 9 and 10 with respect to an airframe or other supporting device. Gyroscopes 11, 12, and 13 are mounted upon stable platform 2. Each gyroscope 11, 12, and 13 is free to precess about one axis, its output axis. The torque or input axes of gyroscopes 11, 12, and 13 are orthogonally disposed to form a cartesian set of coordinates. Detecting means 14, 15, and 16 are connected to be responsive to rotations about the output axes of gyroscopes 11, 12, and 13, respectively. Torquers 17, 18, and 19 are connected to gyroscopes 11, 12, and 13 to apply torques about the output axes thereof in response to voltages from computer 62. Torquers 20, 21, and 22 are connected to apply torques about the axes of gimbals 6 and 3 and platform 2, respectively. Resolver 23 is attached between platform 2 and gimbal 3 to properly orient signals which are sent to torquers 20 and 21 as explained hereinafter. Pickoffs 14 and 16 are electrically connected to resolver 23. Torquers 20 and 21 are electrically connected to resolver 23 through amplifiers 26 and 25, respectively. Pickoff 15 is electrically connected to torquer 22 through amplifier 24.

Figure 2:
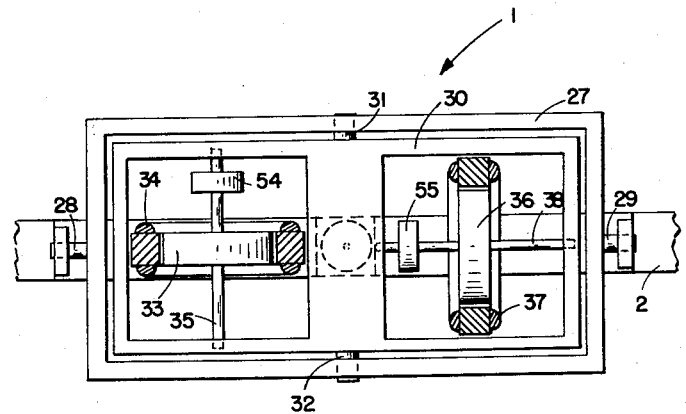
Fig. 2 is a plan view of one embodiment of this invention.
Figure 3:
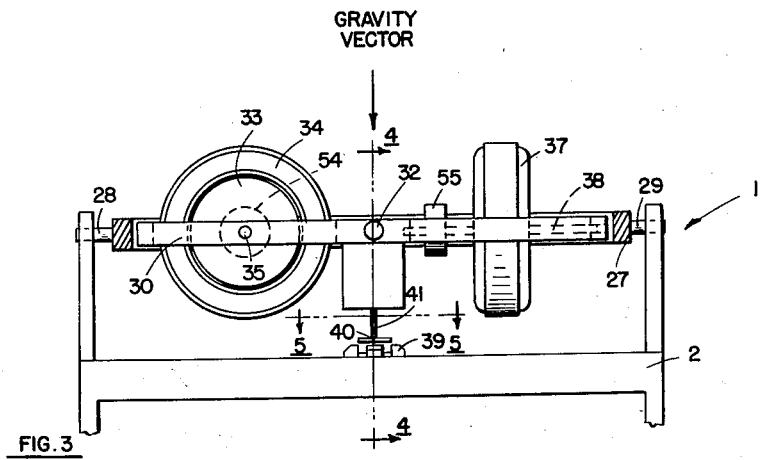
Fig. 3 is a side view of the embodiment shown in Fig. 2.
Figure 6:
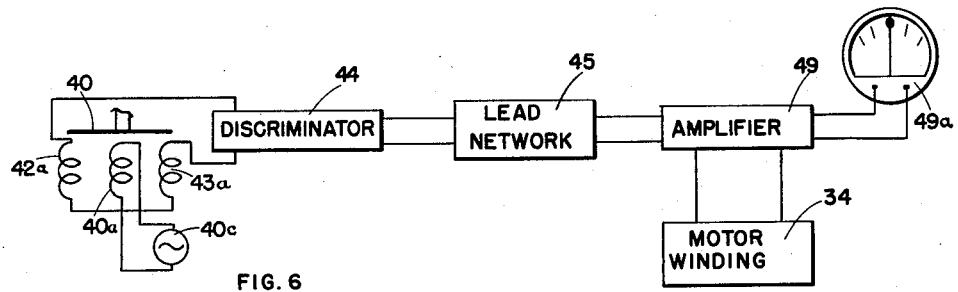
Fig. 6 is a block wiring diagram for one rotor and one pick-off axis of one embodiment of this invention.
Figure 7:
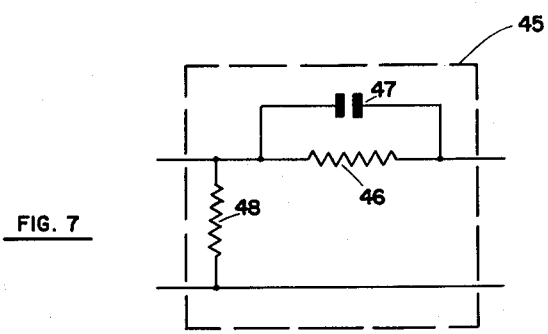
Fig. 7 is a schematic diagram for a typical lead network.

In Figs. 1, 2 and 3 stable reference 2 maintains a fixed orientation with respect to the vertical. Gimbal 27, which has mass and hence inertia, is free to rotate with respect to stable reference 2 upon horizontal shafts 28 and 29. Gimbal 30, which has mass and inertia, is connected to gimbal 27 by means of horizontal shafts 31 and 32. Rotor 33, which has mass and inertia, is driven by means of motor winding 34 and spins upon horizontal shaft 35 which is connected to gimbal 30. Rotor 36, which is similar to rotor 33, is driven by means of motor winding 37 and spins upon horizontal shaft 38 which is connected to gimbal 30 perpendicular to shaft 35. The center of gravity of the mass of gimbal 30 and rotors 33 and 36 is at a non-centroidal point below the intersections of the axes determined by shafts 28, 29, 31, and 32. Movement of gimbal 30 with respect to stable reference 2 is detected by four-directional pickoff 39, shown more particularly in Figs. 4, 5 and 11, which has moving element 40 connected by strut 41 to gimbal 30. Pickoff 39 is electrically connected as shown in Figs. 6, 7 and 11 to motor windings 34 and 37 of rotors 33 and 36 to cause gimbal 30 to remain horizontal. As shown in Figs. 4, 5 and 6, coil 42a wraps around post 42, coil 43a wraps around post 43, coil 50a wraps around post 50 and coil 51a wraps around post 51. Coil 42a and coil 43a are connected in electrical opposition and coil 50a and coil 51a are connected in electrical opposition as shown in Fig. 11. Coil 40a wraps around center post 40b and is energized by alternating current source 40c. When plate 40 is centered, the voltage induced in coil 42a from coil 40a is equal to the voltage induced in coil 43a and the voltage induced in coil 50a is equal to the voltage induced in coil 51a. When plate 40 is moved towards post 43, a higher voltage is induced in coil 43a than is induced in coil 42a. When plate 40 moves towards post 50, a higher voltage is induced in coil 50a than is induced in coil 51a. Coils 42a and 43a are connected to discriminator 44. Discriminator 44 detects the magnitude of movement of plate 40 between post 42 and 43. Discriminator 44 is connected to lead network 45. Lead network 45 comprises resistor 46 in parallel with condenser 47 in its series branch, and resistor 48 in its shunt branch. Lead network 45 is connected to amplifier 49 which in turn is connected to motor winding 34. Meter 49a, connected to amplifier 49, gives a reading which is proportional to the component of instantaneous acceleration in the direction of a line between the center of coils 42a and 43a. An additional identical circuit to that shown in Figs. 6 and 7 is required to control rotor 36 in response to the movement of plate 40 relative to posts 50 and 51 and to measure the component of instantaneous acceleration in the direction of coils 50a and 51a.

Figure 10:
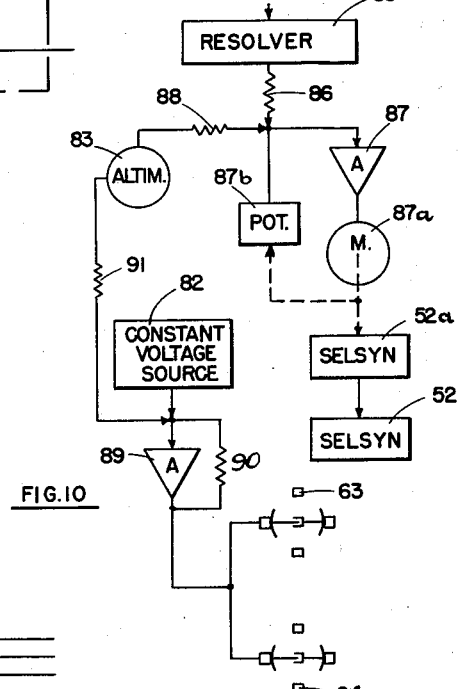
Fig. 10 is a block diagram of an altimeter device used in this invention.

A small synchro 52, shown more particularly in Fig. 4, is connected to gimbal 30 to move trimmer mass 53 relative to gimbal 30 in response to signals from altimeter device 65 to vary the unbalance of gimbals 27 and 30 by as much as 0.01% to compensate for deviations in sphericity of the earth. Synchro 52 is driven an amount $f$ by means of altimeter device 65 shown more particularly in Fig. 10.

$$f = K_1 h + K_2 \cos^2 \phi$$

in which $h$ is the altitude of the device above the surface of the earth. A voltage which is proportional to $h$ is developed by altimeter 83 and is attenuated by resistor 88 to produce a signal which is equal to $K_1 h$. Resolver 85 is a cosine-squared type resolver which develops a voltage, when it is driven by motor 67, which is equal to the cosine squared of $\phi$. The output of resolver 85 is attenuated by resistor 86 to produce a voltage which is equal to $K_2 \cos^2 \phi$. The voltage on resistors 88 and 86 are connected to the input of summing amplifier 87 whose output voltage is applied to the input of motor 87a. Motor 87a drives potentiometer 87b until the voltage output of potentiometer 87b is equal to $$-K_1 h - K_2 \cos^2 \phi$$

When this is true, the shaft of motor 87a has turned selsyn 52a by an angle proportional to $$K_1 h + K_2 \cos^2 \phi$$

Selsyn 52a is electrically connected to selsyn 52 so that selsyns 52 and 52a turn in synchronism.

The voltage from voltage source 82 is connected to feedback summing amplifier 89 through resistor 90 and the negative of the voltage from altimeter 83 is connected to the input of summing amplifier 89 through resistor 91 so that the output of feedback summing amplifier 89 is equal to $1 - C_2 h$.

Figure 9:
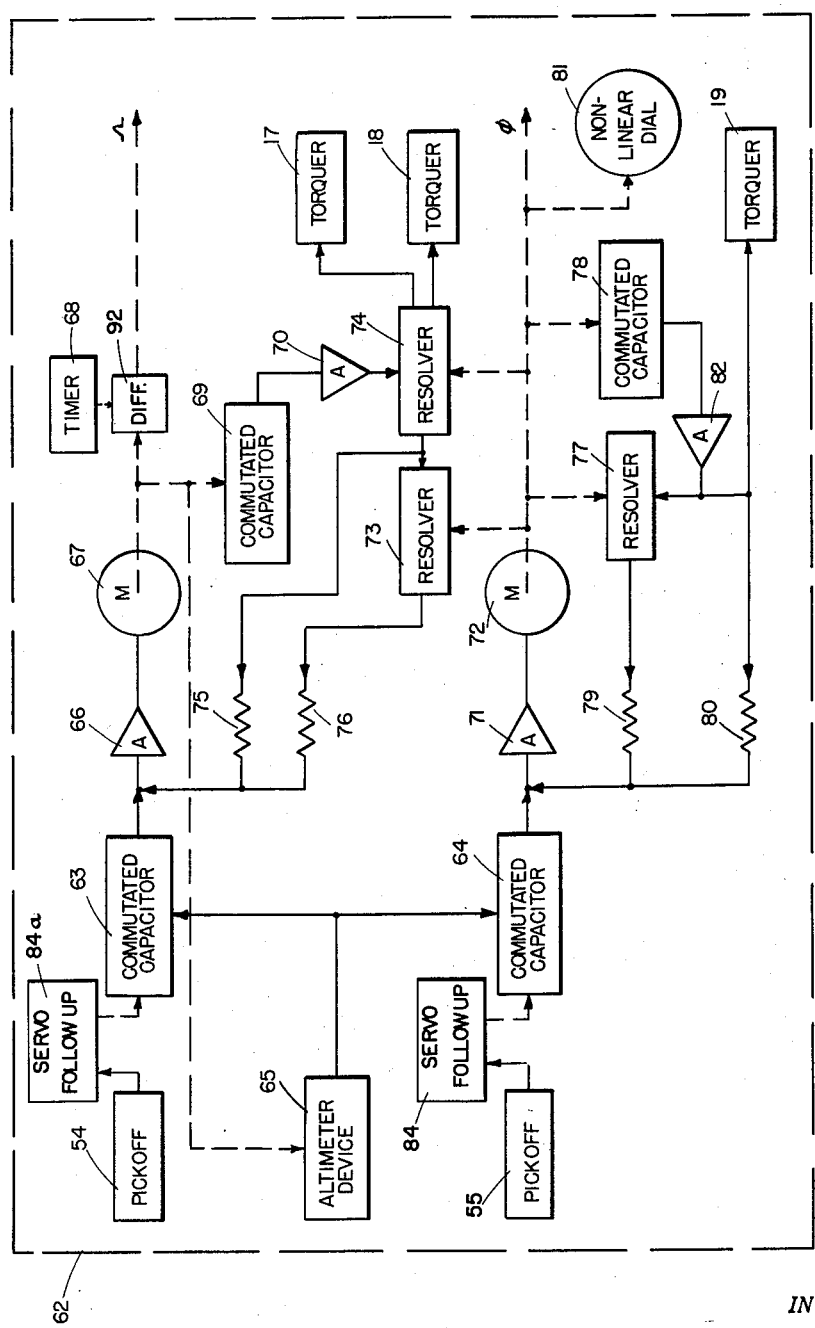
Fig. 9 is a block diagram of a typical computer used in this invention.

In Fig. 9 computer 62 connects the output of pickoffs or resolvers 54 and 55 in device 1 to torquers 17, 18, and 19 upon gyroscopes 11, 12, and 13 respectively. Resolver 54 drives servo follow-up 84a which mechanically rotates commutated capacitor 63 in accordance with the rotation of rotor 33. Resolver 55 drives servo follow-up 84 which rotates commutated capacitor 64 in accordance with the rotation of rotor 36. The structure of commutated capacitors 63 and 64 is shown more particularly in Fig. 10. Altimeter device 65, which is shown in detail in Fig. 10 and is described above, is electrically connected to commutated capacitors 63 and 64. The signal from altimeter device 65 is equal to $1 - C_2 h$ in which $C_2$ is a small constant and $h$ is the altitude of the device above the surface of the earth. Thus the electrical output from commutated capacitor 63 is equal to $$\omega_{33}(1 - C_2 h)$$

in which $\omega_{33}$ is the angular velocity of rotor 33. Similarly the electrical output of commutated capacitor 64 is equal to $$\omega_{36}(1-C_2 h)$$

in which $\omega_{36}$ is the velocity of rotor 36. Notice that commutated capacitors 63 and 64 are derivative devices which differentiate their input shaft rotations. Commutated capacitor 63 is connected to the input of summing amplifier 66, as is also the sum of the outputs from precision resistors 75 and 76. An error signal which represents the difference between the signal from commutated capacitor 63 and the sum of the signals from resistors 75 and 76, is generated at the output of summing amplifier 66. This error signal is connected to motor 67 whereby its shaft is displaced in response to the error signal. In order for the angular displacement of the shaft of motor 67 to be proportional to $\psi$, the sum of the signals from resistors 75 and 76 into the amplifier 66 must be equal to $$C_3 \dot{\psi} \cos \phi (1 + C_4 \cos^2 \phi)$$

in which $\dot{\psi}$ is the time rate of change of inertial longitude of the device. When the output from commutated capacitor 63 equals the sum of the outputs from resistors 75 and 76, the shaft rotation of motor 67 must be proportional to $\psi$. It will be shown here that when the shaft rotation of motor 67 is proportional to $\psi$ the output from commutated capacitor 63 equals the sum of the output from resistors 75 and 76. Motor 67 turns commutated capacitor 69 in accordance with $\psi$. Capacitor 69 differentiates its shaft input. The output of capacitor 69 is amplified by amplifier 70 and is connected to the electrical input of resolver 74. The mechanical shaft rotation of resolver 74 is proportional to $\phi$ as explained hereinafter. Resolver 74 generates a signal which is proportional to $\dot{\psi} \sin \phi$ and $\dot{\psi} \cos \phi$. The voltage which is proportional to $\dot{\psi} \sin \phi$ is connected to torquer 18 and the voltage which is proportional to $\dot{\psi} \cos \phi$ is connected to torquer 17 to place torques upon gyroscopes 11 and 12, respectively, to cause platform 2 to remain level oriented at all times as explained hereinafter. The voltage which is proportional to $\dot{\psi} \cos \phi$ is also connected from the output of resolver 74 to the input of resistor 75 which linearly attenuates the signal to the proper value so that the sum of the voltage outputs from resistors 75 and 76 is equal to the voltage from capacitor 63. The voltage which is proportional to $\dot{\psi} \cos \phi$ is also connected to the input of resolver 73. Resolver 73 is a cosine-squared type resolver which multiplies its electrical input by the cosine squared of its shaft rotation. Thus the electrical output of resolver 73 is proportional to $\dot{\psi} \cos^3 \phi$. The voltage output from resolver 73 is connected to the input of resistor 76 which linearly attenuates the voltage to the proper value so that the sum of the voltage outputs from resistors 75 and 76 is equal to the voltage output of capacitor 63. It is seen that by choosing the proper values for resistors 75 and 76 the sum of the outputs from resistors 75 and 76 is exactly equal to the output of capacitor 63 when, and only when, the shaft rotation of motor 67 is proportional to $\psi$. The mechanical shaft rotation of motor 67 is connected to differential 92. Timer 68 is also connected to differential 92 so that the rotation of the earth is subtracted from the output shaft rotation of motor 67 to create a shaft rotation at the output of differential 92 which is proportional to $\Lambda$. The output of capacitor 64 must be equal to $$C_5 \dot{\phi}(1 + C_6 \cos^2 \phi)$$

for the shaft rotation of motor 72 to be proportional to $\phi$. This voltage is generated at the output terminals of resistors 79 and 80 and is connected to the output of capacitor 64 at the input of summing amplifier 71. The error signal from amplifier 71 drives motor 72 which produces a shaft rotation which is proportional to $\phi$. To show that this is true, it need only be shown that the output voltage from resistors 79 and 80 is equal to the output voltage from capacitor 64. When motor 72 drives commutated capacitor 78 in accordance with $\phi$, the output voltage of capacitor 78, amplified by amplifier 82, produces a signal proportional to $\dot{\phi}$. This $\dot{\phi}$ voltage is connected to torquer 19 upon gyroscope 13 to maintain platform 2 level at all times as explained hereinafter. The output voltage from amplifier 82 is also connected to the input of resistor 80 and to the input of cosine squared resolver 77 whose shaft rotation is proportional to $\phi$. The electrical voltage output from resolver 77 is proportional to $\dot{\phi} \cos^2 \phi$. Resistors 79 and 80 attenuate the voltages applied at their input by the correct amount to make them equal to the output of capacitor 64 when the shaft rotation of motor 72 is exactly proportional to $\dot{\phi}$. Motor 72 drives nonlinear dial 81 which is calibrated in terms of $\phi'$.

In operation, stabilized platform 2 tends to remain stationary with respect to inertial space because of the stabilizing effects of gyroscopes 11, 12, and 13. Whenever a disturbing torque is placed upon platform 2, one or more of gyroscopes 11, 12, and 13 starts to precess. The precessions of gyroscopes 11, 12, and 13 are detected by means of pickoffs 14, 15, and 16, respectively. Pickoffs 14, 15, and 16 may be, for example, of an electromagnetic or electrostatic type. Because shafts 9 and 10 turn, due to maneuvers of the supporting vehicle, about an azimuth axis relative to platform 2, the outputs from pickoffs 14 and 16 are connected to resolver 23 which distributes the outputs of these pickoffs to torquer 20 or torquer 21 in accordance with the maneuvers of the aircraft or supporting vehicle about an azimuth axis relative to platform 2. Thus, for example, when the vehicle is moving in one horizontal direction the signal from pickoff 14 controls torquer 20; but when the vehicle is moving at right angles to its original direction, the signal from pickoff 14 controls torquer 21. The signals from pickoffs 14, 15, and 16 are amplified by means of amplifiers 24, 25, and 26 so that energy of a certain amount is transferred to torquers 20, 21, and 22. Thus, platform 2 tends to remain oriented with respect to inertial space. Signals are transferred from device 1 to computer means 62, shown in Fig. 9, thence to torquers 17, 18, and 19 which are on the precession axes of gyroscopes 11, 12, and 13, respectively. Precession torques are generated by torquers 17, 18, and 19 about the precession axes of gyroscopes 11, 12, and 13, respectively, which cause pickoffs 14, 15, and 16 to be unbalanced by the proper amount to cause torquers 20, 21, and 22 to rotate platform 2, with respect to the fixed stars, by the proper amount to maintain platform 2 horizontal at all times.

Referring now to Fig. 2, accelerations in a horizontal direction cause torque to be applied about the axes of support of gimbal masses 27 and 30 because the center of gravity of the supported masses is below the intersection of the axes of support. This torque moves the supported masses slightly and causes pickoff 39 to become unbalanced. In the circuit of coils 42a and 43a, any movement of element 40 toward coil 42a and away from coil 43a causes a higher voltage to be induced in coil 42a than is induced in coil 43a. Coils 42a and 43a are connected in opposition so that the net voltage applied to discriminator 44 is the difference between the voltages induced in coils 42a and 43a. By means of electrical networks, such as bridge and lead networks shown in Figs. 6 and 7, the pickoff 39 causes electrical energy to be supplied to the correct rotors to change their angular momentum in the direction to cause the gimbal mass 30 to maintain its centered position. Each rotor and its associated pair of sensitive axis pickoff coils are connected together by means of an electrical circuit identical to that shown in Figs. 6 and 7. Because of the electrical connection between pickoff 39 and motor windings 34 and 37, as shown in Figs. 6 and 7, rotors 33 and 36 are caused to accelerate angularly with respect to gimbal 30 in a direction such that the reactance torques acting upon the gimbal mass causes gimbal 30 to remain in its horizontal position. The vector sum of the angular velocities of rotors 33 and 36 is proportional to the integral of the horizontal acceleration applied to the supported structure. Because the torque upon the platform is proportional to the acceleration force, the device of this invention can be used to measure the integral of a torque.

Notice that if stable reference 2 is turned about a vertical axis, the angular momentum of rotor 33 is transferred to rotor 36 and the angular momentum of rotor 36 is transferred to rotor 33. When the platform 2 is turned, with respect to fixed stars, about a vertical axis, the components of angular momentum change along horizontal axes, which are defined by the axes of the rotors, but the vector sum of the two components remains constant in magnitude and direction. Consider, for example, a rotation of stable reference about the vertical by an angle of 90°. When stable reference 2 turns, a gyroscopic torque is placed upon gimbals 27 and 30 which unbalances pickoff 39 and causes the angular velocity of individual rotors 33 and 36 to change and thereby re-zero pickoff 39. The vector sum of the angular momentums of rotors 33 and 36 after the rotation of stable reference 2 about the vertical is equal in magnitude and direction to the vector sum of angular momentums of rotors 33 and 36 before the rotation of stable reference 2 about the vertical because no net torque is applied about any horizontal axis. Thus, when stable reference 2 is rotated 90°, rotor 33 has the same angular momentum that rotor 36 had before the rotation of stable reference 2, while rotor 36 has the same angular momentum that rotor 33 had before the rotation of stable reference 2. It is therefore seen that regardless of the orientation of stable reference 2 about a vertical axis the vector sum of the angular momentums of rotors 33 and 36 in a horizontal plane remains constant.

Figure 8:
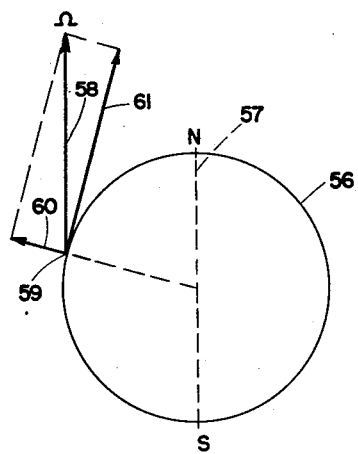
Fig. 8 is a vector diagram showing vertical and horizontal components of earth rotation.

Coriolis forces are created when the device of this invention moves over the surface of the rotating earth. At any point upon the earth, the vector which represents the total rotation about a local vertical axis, due to the rotation of the earth, of the rotor axes at that particular point, can be divided into two perpendicular components, as shown by the vector rotation in Fig. 8. In Fig. 8, rotation is defined by a vector parallel to the axis of rotation. Vector 58 represents the rotation of earth 56, vector 60 represents the vertical component, and vector 61 represents the north-south component of vector 58. The only component of earth rotation which contributes to Coriolis force in the horizontal plane is the vertical component of earth rotation at that point. By definition, Coriolis forces are always at right angles, both to the rotation and to the linear motion which causes them. Thus, the north-south component of angular velocity couples with the east-west velocity of the device to cause a vertical Coriolis force, while the vertical component of angular velocity couples with any velocity in the horizontal plane to create a Coriolis force in the horizontal plane at right angles to the horizontal velocity. Thus, a moving accelerometer device which is responsive to rotations about the vertical axis due to the vertical component of the earth rotation and therefore experiences noncompensating horizontal Coriolis force. However, the device of this invention is self-compensating and not responsive to rotations about the local vertical axis. It is therefore not affected by Coriolis forces. Because of the gimbal mounting of frame 30 with respect to stable reference 2, no torques can be applied to rotors 33 and 36 about any horizontal axis and hence, no change of total angular momentum of the two rotors occurs except that which is caused by accelerations in the local horizontal plane. Because both rotors are attached to the same frame and because the frame is free to turn about horizontal axes, the two rotors are mechanically coupled through their gyroscopic action as set forth above. Consider a first rotor 33, which has the vector which represents its rotation extending along a hypothetical X-axis; a second rotor 36, which has the vector which represents its rotation extending along a hypothetical Y-axis; and the local vertical extending along a hypothetical Z-axis. The X, Y, and Z axes form a right-handed system of coordinates. When rotor 33 is turned in a positive direction about the Z-axis, rotor 36 is also turned in a positive direction about the Z-axis because of common frame 30. Consider the situation immediately after the rotation starts. Rotor 33 starts to precess about the Y-axis, thus unbalancing pickoff 39, thereby changing the angular momentum of rotor 36; rotor 36 starts to precess about the X-axis, thus unbalancing pickoff 39, thereby changing the angular momentum of rotor 33. This operation is exactly self-compensating so that the vector sum of the angular momentums of rotors 33 and 36 is constant in both direction and magnitude as frame 30 is turned about the Z-axis. Hence, the device of this invention is not responsive to rotation about the local vertical axis. The device of this invention completely compensates for Coriolis forces which are caused by earth rotation so that they do not appear as a factor in the output of the device.

Consider the special case where the axis of one of the rotors is oriented north and south, while the axis of the other rotor is oriented east and west, and further where the supporting platform is moving north. The total angular momentum of the rotors of the device is proportional to the velocity of the device in the northerly direction plus the easterly motion due to the rotation of the earth. The component of angular momentum which corresponds to the easterly motion due to earth rotation must, of course, be properly set into the instrument at the starting point. A rotation of the device about its vertical axis, due to the rotation of the earth, doe not affect the magitude or direction, in the horizontal plane, of the total angular momentum of rotors 33 and 36 as explained above. Therefore the angular velocity of the rotor whose axis is initially oriented east-west is directly proportional to the north-south velocity of the device while the angular velocity of the rotor whose axis is initially oriented north-south is directly proportional to the east-west velocity over the surface of the earth plus the velocity corresponding to the east-west velocity of the earth. The accuracy of the device is not affected by Coriolis force caused by earth rotation.

One particular application of the device of this invention is to automatically provide a continuous reading of latitude and longitude position of the device upon the surface of the earth. When the axis of one rotor is aligned north and south while the axis of the other rotor is aligned east and west, the angular velocity of the first rotor is proportional to the east-west velocity of the object over the surface of a nonrotating earth while the angular velocity of the second rotor is proportional to the north-south velocity of the object over the surface of the earth. By the use of appropriate computer means as shown in Fig. 9, the angular velocities of the rotors which are measured by means of pickoffs 54 and 55 are continuously transferred into position coordinates which represent the distance which the object has traveled north-south, and east-west. The north-south distance is a direct measure of the latitude angle while the east-west velocity must be divided by the cosine of the latitude angle and integrated to obtain the longitude angle. The outputs from the computers may drive stable reference 2 through a polar axis mount (not shown) relative to inertial axes to orient stable reference 2 into a north-south direction in lieu of applying torques to the gyroscopes as previously discussed.

The special case can be extended by a transformation of coordinates to a general case wherein the supporting platform travels on any path over the surface of the earth, and wherein the two rotors do not point north-south or east-west, respectively.

The device of this invention can be placed upon a guided missile and the axes of the rotors oriented parallel and perpendicular, respectively, to a guidance plane. A guidance plane is defined as a plane passing through the center of the earth and the predetermined great circle course of the guided missile. The rotation of one rotor then generates a signal proportional to the velocity relative to a nonrotating earth along the predetermined course while the other rotor generates a signal proportional to the velocity relative to a nonrotating earth perpendicular to the guidance plane.

Thus, this invention provides means, which is completely unresponsive to errors caused by Coriolis force due to earth rotation, for determining the magnitude and direction of the instantaneous velocity of a stable reference over the surface of the earth.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Computing apparatus comprising a first mass supported for three degrees of angular freedom about a noncentroidal axis, a second mass supported upon said first mass with angular freedom with respect to said first mass about a single axis, a third mass supported upon said first mass with angular freedom with respect to said first mass about a single axis normal to the axis of angular freedom of said second mass, and means responsive to angular displacement of said first mass for applying torques to said second and third masses about their axes of freedom in the sense and magnitude required to prevent angular displacement of said first mass whereby if said first mass is rotated about an axis normal to the axes of freedom of said second and third masses the decrement of angular momentum suffered by one of said second and third masses is equal to the increment of angular momentum experienced by the other of said second and third masses.

2. A device for determining instantaneous position and velocity upon the surface of the earth comprising a stable reference, a frame, a two axis gimbal system connected between said stable reference and said frame, two motors whose rotors are at right angles to each other attached to said frame, said frame being adjusted so that said rotors are perpendicular to the gradient of the gravity field exclusive of centrifugal force, the center of gravity of said motors and said frame being below the point of intersection of the axes of said gimbals, electrical movement detecting means connected between said frame and said stable reference, servo amplifier means connected between said detecting means and the windings of said motors, angular motion detecting means attached to the shafts of said rotors for measuring the angular rotation thereof, and computer means connected between said angular motion means and said stable reference for controlling said stable reference to maintain it horizontal with respect to the earth, whereby accelerations in a horizontal direction cause a torque to be applied to said frame which causes, through said servo amplifier, the angular momentum of said rotors to be changed by an amount to prevent said frame from moving with respect to said stable reference, and the vector sum of the angular velocities of said two motors is proportional to their velocity over the surface of the earth, thus causing the output of said computer to be a function of their position upon the surface of the earth.

3. A device as recited in claim 2 in which said stable reference comprises a frame mounted with three degrees of freedom with respect to its supporting structure, three gyroscopes attached to said frame with their input axes orthogonal, torquing means attached to said frame, precession detecting means attached to the output axes of said gyroscopes, amplifying means connected between said precession detecting means and said torquing means, torquing means connected to said gyroscopes to apply torques about the output axes thereof connected to said computer means to apply torques in response thereto whereby said stable reference is maintained horizontal with respect to the surface of the earth.

4. A device as recited in claim 2 in which said servo amplifier comprises two circuits, each said circuit comprising a discriminator, a lead network, and an amplifier, each said discriminator being connected to said motion detecting device, the first said discriminator having signals applied to it in accordance with the movement of said device in one direction, the second said discriminator having signals applied to it in accordance with the movement of said device in a direction perpendicular to the direction corresponding to said signals applied to said first discriminator, the output of each said discriminator being connected to a separate said lead network, the output of each said lead network being applied to the input of a separate said amplifier, the output of each said amplifier being connected to the windings of a different said motor whereby each said circuit causes its associated said motor to change in angular momentum to reduce said signal applied to its input to zero.

5. A device as recited in claim 2 in which said computer comprises a first commutated capacitor, the mechanical input to said capacitor being connected to one of said angular motion detecting means, a second commutated capacitor the mechanical input to said second capacitor being connected to the second said angular motion detecting means, an altimeter device, the electrical input to said first and second capacitors being connected to said altimeter device, a first and second summing amplifier, the output of said first capacitor being connected to the input of said first summing amplifier, the output of said second capacitor being connected to the input of said second summing amplifier, a first and second motor, the output of said first summing amplifier being connected to said first motor, the output of said second summing amplifier being connected to said second motor, a third commutated capacitor, the mechanical input of said third capacitor being connected to the output of said first motor, a sidereal clock, said clock being mechanically connected to the output of said first motor to cause a shaft rotation which is proportional to the longitude of the device upon the surface of the earth, a first amplifier, a trigonometric resolver, the output of said third capacitor being connected to the input of said first amplifier, the output of said first amplifier being connected to the input of said resolver, the mechanical input of said resolver being connected to the shaft of said second motor, a first cosine squared resolver, the electrical input of said first cosine squared resolver being connected to the cosine out of said first mentioned resolver, the mechanical input of said first cosine squared resolver being connected to the shaft of said second motor, a first and second attenuating resistor, said first resistor being connected to the cosine output of said first mentioned resolver, said second resistor being connected to the output of said first cosine squared resolver, the output ends of said resistors being connected to the input of said first summing amplifier, a fourth commutated capacitor, said mechanical input to said fourth capacitor being connected to the shaft of said second motor, a second amplifier, a second cosine squared resolver, said second amplifier being connected between the electrical output of said fourth commutated capacitor and the electrical input of said second cosine squared resolver, the mechanical input of said second cosine squared resolver being connected to the shaft of said second motor, a third and fourth attenuating resistor, said third resistor being connected to the output of said second amplifier, said fourth resistor being connected to the output of said second cosine squared resolver, the output ends of said third and fourth resistors being connected to the input of said second summing amplifier, a nonlinear dial connected to the shaft of said second motor to show the actual latitude upon the surface of the earth, the signals connected to said stable references being the sine output of said first trigonometric resolver, the cosine output of said first trigonometric resolver and the output of said fourth commutated capacitor.

6. A device for determining the position of a stable reference with respect to the earth comprising two motors whose rotors are at right angles to each other and perpendicular to the gradient of the gravity field exclusive of centrifugal force, a two axes gimbal system between said stable reference and said motors with the center of gravity of said motors and gimbal system below the point of intersection of the gimbal axes, movement detecting means electrically connected between the inner gimbal of said gimbal system and said stable reference, an angular velocity measuring means for measuring the velocity of said rotors whereby torques applied to said gimbal system due to accelerations over the surface of the earth change the angular momentum of the rotors of said motors in a direction and with a magnitude to prevent said gimbal system from turning with respect to said stable reference, the angular velocity of said rotors being proportional to the velocity over the surface of the earth.

7. A measuring device comprising a frame having two degrees of freedom in a horizontal plane; a two axes gimbal system for supporting said frame by said two degrees of freedom, the intersection of the axes of said gimbal system being above the center of gravity of said frame, said frame being responsive to accelerations in a horizontal direction; a first and second shaft attached to said frame positioned at right angles to each other upon a first and second horizontal axis; a first mass symmetrical about the axis of said first shaft and rotatable thereon with respect to said frame; a second mass symmetrical about the axis of said second shaft and rotatable thereon with respect to said frame; a first torque motive means for applying torque equally and oppositely to said first mass and said frame about said first axis; a second torque motive means for applying torque equally and oppositely to said second mass and said frame about said second axis, and servo means including a position pickoff responsive to angular motion of said frame about the axes of said gimbal system for energizing said torque motive means in the sense required to positively prevent angular motion of said frame with respect to a horizontal plane whereby the vector sum of the angular velocities of said first and second masses taken along the axes of said first and second shafts, respectively, is proportional to the velocity of said frame over the surface of the earth.

8. A device as recited in claim 7 and further comprising first and second pickoff means connected to said first and second shaft for measuring the angular velocity of said first and second rotating masses to thereby measure the velocity due to the accelerations to which said frame is responsive.

9. A device as recited in claim 7 in which the output of said servo means for energizing said torque motive means is proportional to and a measure of horizontal acceleration applied to said frame.

10. A device as recited in claim 7 and further comprising means for measuring the angular velocities of said masses relative to said frame to thereby obtain a measure of the first integral of the acceleration applied to said frame in a horizontal direction.

11. A device as recited in claim 7 and further comprising means for indicating the magnitude of the output of said pickoff means to thereby measure the acceleration to which said frame is responsive.

12. A measuring device comprising a first and second rotatable mass, a frame rotatable about two perpendicular axes in a horizontal plane not including its mass center and hence responsive to accelerations in said plane, first and second motor means for applying torques to said masses equally and oppositely to said frame, servo means responsive to angular motion of said frame for controlling the torque output of said first and second motor means to prevent the angular motion of said frame due to accelerations to which it is responsive, means for supporting said masses and said frame upon an object capable of motion in space without impairing their freedom for rotation, and first and second means for measuring the angular velocity relative to said frame of said first and second masses, to thereby obtain a measure of the velocity and distance traveled by said object in a horizontal plane.

13. A measuring device comprising three masses, two of which are carried by the third with freedom for relative rotative movement between said two and said third, said masses being balanced about two perpendicular axes in a horizontal plane; means for applying a first and second torque to said first and second masses; means for measuring the velocity and displacement of said first and second masses relative to said third mass; means for applying a third torque to said third mass; and means sensitive to displacement of said third mass connected to control said first and second torques to prevent movement of said third mass, whereby the vector sum of the measured angular velocities of said first and second masses is proportional to the first integral of said third torque.

14. A measuring device comprising reference frame means having freedom for angular movement about a pair of perpendicular horizontal axes, a pair of rotatable masses carried by said reference frame means upon axes parallel to said first-named axes, a pair of motor torque means connected between said masses and said frame means for rotating said masses, a pair of angular pickoff means for measuring the angular velocities of said rotating masses; pickoff means for measuring the displacement of said reference frame means; and electronic servo means connected to said motor means and said pickoff means responsive to the displacement of said pickoff means for controlling said motor means, whereby said masses are rotated and the vector sum of the angular velocities of said rotors is proportional to the integral of external torque applied to said frame means.

15. A measuring device comprising reference frame means, two rotational inertia means carried by said reference means and adapted to be rotated about mutually perpendicular axes in a horizontal plane with respect thereto, two motor means for rotating said inertia means, two pickoff means for measuring the displacement and velocity of said inertia means, means for applying to said reference frame about any horizontal axis a torque to be integrated, pickoff means for measuring the displacement and velocity of said reference frame means in response to said torque, and servo means connected to said last-named pickoff means to be responsive to the displacement of said reference frame means for controlling said two motor means to induce a reactive torque in said reference means to prevent movement thereof whereby the vector sum of the angular velocities of said inertia means is proportional to the first integral of said torque to be integrated.

16. A measuring device comprising a pair of rotatable masses, a third mass rotatable about a noncentroidal horizontal axis and hence responsive to accelerations; a pair of motor means for applying torques equally and oppositely about said pair of masses and said third mass; electronic servo means for controlling said torque means so as to apply to said third mass at all times a torque equal and opposite to that produced by accelerations to which it is subjected; two axes gimbal means for supporting said masses upon an object capable of motion in space; and a pair of position pickoff means for measuring the angular velocities of the said first two masses to measure thereby the velocity of said object in a horizontal plane.

References Cited in the file of this patent

UNITED STATES PATENTS

| | | |
|---|---|---|
| 1,253,574 | Carrie | Jan. 15, 1918 |
| 2,208,207 | Boykow | July 16, 1940 |
| 2,414,291 | Evans | Jan. 14, 1947 |